US011148516B2

(12) United States Patent
 Ogawa et al.

(10) Patent No.: US 11,148,516 B2
(45) Date of Patent: Oct. 19, 2021

(54) BATTERY CASE STRUCTURE FOR ELECTRIC-POWERED VEHICLES, AND ELECTRIC-POWERED VEHICLE

(71) Applicant: HONDA MOTOR CO., LTD., Tokyo (JP)

(72) Inventors: Naoto Ogawa, Wako (JP); Yusuke Mutoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 868 days.

(21) Appl. No.: 15/755,656

(22) PCT Filed: Jul. 6, 2016

(86) PCT No.: PCT/JP2016/070023
§ 371 (c)(1),
(2) Date: Feb. 27, 2018

(87) PCT Pub. No.: WO2017/038247
PCT Pub. Date: Mar. 9, 2017

(65) Prior Publication Data
US 2020/0231049 A1    Jul. 23, 2020

(30) Foreign Application Priority Data

Aug. 31, 2015   (JP) .............................. JP2015-170042

(51) Int. Cl.
 *B60K 1/04*      (2019.01)
 *B62K 11/10*     (2006.01)
 (Continued)

(52) U.S. Cl.
 CPC ................ *B60K 1/04* (2013.01); *B60L 50/64* (2019.02); *B60L 50/66* (2019.02); *B60L 53/80* (2019.02);
 (Continued)

(58) Field of Classification Search
 CPC . B60K 1/04; B60L 53/80; B60L 50/64; B60L 50/66; B62K 19/30; B62K 11/10; B62J 43/00
 See application file for complete search history.

(56) References Cited

U.S. PATENT DOCUMENTS 4,044,852 A  *  8/1977  Lewis ...................... B62M 6/55
                                                     180/206.4
4,077,485 A  *  3/1978  Bonora .................... B62J 11/00
                                                       180/231
(Continued)

FOREIGN PATENT DOCUMENTS

EP     2586686      5/2013
EP     2759465      7/2014
(Continued)

OTHER PUBLICATIONS

International Search Report and Written Opinion for International Patent Application No. PCT/JP2016/070023 dated Sep. 13, 2016, 11 pages.
(Continued)

*Primary Examiner* — John D Walters
(74) *Attorney, Agent, or Firm* — Amin, Turocy & Watson, LLP (57) ABSTRACT

Provided are: a battery case structure for electric-powered vehicles wherein restrictions on the size or the like of a battery mountable on electric-powered vehicles are alleviated, and the attaching/detaching operability is improved; and an electric-powered vehicle. A battery case structure is equipped with: a cover member which is disposed below the center in the longitudinal direction of a main frame and rocks in the transverse direction of the vehicle; and a lower frame which is connected to the main frame, and is disposed in such a manner as to go around the bottom of the cover member. A battery is detachably inserted into the cover
(Continued)

member through the detachable opening separated from the main frame. When the detachable opening is brought close to the main frame, the battery housed in the cover member is supported on the lower frame and housed between the lower frame and the main frame.

4 Claims, 7 Drawing Sheets

(51) Int. Cl.
    *B60L 50/64*     (2019.01)
    *B60L 53/80*     (2019.01)
    *B60L 50/60*     (2019.01)
    *B62J 43/00*     (2020.01)
    *B62K 19/30*     (2006.01)

(52) U.S. Cl.
    CPC ............... *B62J 43/00* (2020.02); *B62K 11/10* (2013.01); *B62K 19/30* (2013.01); *B60K 2001/0461* (2013.01); *B60K 2001/0488* (2013.01); *B60L 2200/12* (2013.01); *B60Y 2200/126* (2013.01); *B62K 2202/00* (2013.01)

(56) References Cited

U.S. PATENT DOCUMENTS

| | | |
|---|---|---|
| 4,723,618 A | 2/1988 | Coonradt |
| 8,592,069 B1 * | 11/2013 | Anderson ............. H01M 50/20 |
| | | 429/100 |
| 8,636,092 B2 * | 1/2014 | Kawatani ............... B62K 11/02 |
| | | 180/68.5 |

FOREIGN PATENT DOCUMENTS

| | | |
|---|---|---|
| JP | 56-060699 | 5/1981 |
| JP | 59-131390 | 9/1984 |
| JP | 2003-127941 | 5/2003 |
| JP | 2009-173185 | 8/2009 |
| JP | 2010-076531 | 4/2010 |
| JP | 2013-209054 | 10/2013 |
| JP | 2014-141166 | 8/2014 |

OTHER PUBLICATIONS

European Office Action for European Patent Application No. 16841279.9 dated Apr. 25, 2019.
Extended European Search Report for European Patent Application No. 16841279.9 dated Aug. 2, 2018.
Japanese Office Action for Japanese Patent Application No. 2017-537624 dated Jul. 17, 2018.

* cited by examiner

BATTERY CASE STRUCTURE FOR ELECTRIC-POWERED VEHICLES, AND ELECTRIC-POWERED VEHICLE

TECHNICAL FIELD

The present invention relates to a battery case structure for a saddle-type electric (-powered) vehicle whose power source is a chargeable battery and to a saddle-type electric vehicle provided therewith.

BACKGROUND ART

Japanese Laid-Open Patent Publication No. 2003-127941 describes a battery attaching and detaching structure of an electric vehicle. In this battery attaching and detaching structure, a battery is placed between right and left vehicle body frames located below a seat and can be attached and detached by opening the seat.

SUMMARY OF INVENTION

However, since the space which can be formed below the seat is limited, in the above-described battery attaching and detaching structure, the size and shape of a mountable battery are greatly restricted, and, in particular, it is difficult to mount a large battery.

Moreover, the seat is placed above the vehicle body frames. Attaching and detaching the battery by opening this seat requires lifting the battery, which is relatively heavy in weight, above a vehicle body, and there is room for improvement in an operation to attach and detach the battery.

Thus, a main object of the present invention is to provide a battery case structure of an electric vehicle that can ease restrictions on the size and the like of a mountable battery.

Another object of the present invention is to provide a battery case structure of an electric vehicle with improved battery attaching and detaching operability.

Still another object of the present invention is to provide an electric vehicle provided with the above-described battery case structure.

A battery case structure of an electric vehicle according to the present invention has the features below.

A first feature; the battery case structure of an electric vehicle according to the present invention is a battery case structure of a saddle-type electric vehicle whose power source is a battery that is chargeable, and the battery case structure includes: a cover member that is placed below a central area of a main frame of the electric vehicle in a front-back direction and swings in a vehicle transverse direction; and a lower frame that is connected to the main frame and placed round a lower area of the cover member. As the cover member swings, an attaching and detaching opening provided in an upper part of the cover member approaches or moves away from the main frame, the battery is detachably inserted into the cover member through the attaching and detaching opening that has moved away from the main frame, and, when the attaching and detaching opening approaches the main frame, the battery inserted into the cover member is housed between the lower frame and the main frame while being supported above the lower frame.

A second feature; the battery case structure further includes a lower rubber mount that transfers the weight of the battery in a vertical direction to the lower frame between a lower end of the battery supported above the lower frame and the lower frame.

A third feature; the battery case structure further includes a lateral rubber mount that is provided on the side of the lower frame and receives a load in a vehicle front-back direction from the battery, and, on the side of the battery, a guide that guides the lateral rubber mount when the cover member swings is provided.

A fourth feature; the swing center of the cover member is placed on the vehicle lower area's side and provided off the center of the cover member in the vehicle transverse direction toward a direction where the attaching and detaching opening moves away from the main frame.

An electric vehicle according to the present invention has the following feature.

The electric vehicle according to the present invention is a saddle-type electric vehicle whose power source is a battery that is chargeable, and the electric vehicle includes: as a battery case structure that detachably houses the battery, a cover member that is placed below a central area of a main frame in a front-back direction and swings in a vehicle transverse direction; and a lower frame that is connected to the main frame and placed round a lower area of the cover member. As the cover member swings, an attaching and detaching opening provided in an upper part of the cover member approaches or moves away from the main frame, the battery is detachably inserted into the cover member through the attaching and detaching opening that has moved away from the main frame, and, when the attaching and detaching opening approaches the main frame, the battery inserted into the cover member is housed between the lower frame and the main frame while being supported above the lower frame.

With the first feature of the battery case structure of an electric vehicle according to the present invention, by swinging the cover member, it is possible to insert the battery detachably into the cover member through the attaching and detaching opening that has moved away from the main frame. Moreover, by making the attaching and detaching opening approach the main frame by swinging the cover member into which the battery is inserted, it is possible to support the battery above the lower frame, that is, to house the battery between the lower frame and the main frame of the electric vehicle. The cover member is placed below the central area of the main frame in the front-back direction, and the lower frame is placed round a lower area of the cover member. As a result, as compared to a space between the right and left vehicle body frames below a seat, for example, it is possible to freely form a space for housing the battery. Therefore, it is possible to ease restrictions on the size and shape of a battery that can be mounted on the electric vehicle.

Moreover, by swinging the cover member in the vehicle transverse direction that is placed as described above, it is possible to house the battery or take out the housed battery. Therefore, there is no need to lift the battery above a vehicle body as in a case in which, for example, the battery is attached and detached together with the opening and closing of the seat, whereby it becomes possible to improve battery attaching and detaching operability.

With the second feature of the battery case structure of an electric vehicle according to the present invention, it is possible to transfer the weight of the battery housed in the electric vehicle in the vertical direction to the lower frame via the lower rubber mount. As a result, since it is possible to reduce a load that is applied to the cover member from the battery, the durability of the battery case structure can be improved. Moreover, since there is no need to increase the strength of the cover member excessively, restrictions on a selectable material can be eased, which makes it possible to reduce manufacturing costs.

With the third feature of the battery case structure of an electric vehicle according to the present invention, when the cover member is swung, the lateral rubber mount provided on the side of the lower frame is guided into the guide provided in the battery. This makes it easy to perform positioning when the battery is housed. Moreover, since the battery is housed in a state in which the lateral rubber mount is in contact with the guide in the cover member, a load which is applied from the battery in the vehicle front-back direction can be received by the lateral rubber mount. This makes it possible to reduce a load that is applied to the cover member from the battery. As a result, it is possible to improve the durability of the battery case structure and reduce production costs.

With the fourth feature of the battery case structure of an electric vehicle according to the present invention, as compared to a case in which the center of the cover member in the vehicle transverse direction is set as the swing center, it is possible to reduce the amount of displacement by which a lower end of the cover member is displaced toward a lower area of the vehicle with a swing. Therefore, when the cover member is swung to mount and demount the battery, it is possible to prevent the cover member from interfering with the other component elements of the electric vehicle and improve design flexibility.

With the features of the electric vehicle according to the present invention, by being provided with the above-described battery case structure, it is possible to ease restrictions on the size and shape of a battery which can be housed therein and improve battery attaching and detaching operability.

DESCRIPTION OF EMBODIMENTS

Hereinafter, a preferred embodiment of a battery case structure of an electric vehicle (hereinafter also referred to simply as a battery case structure) and an electric vehicle according to the present invention will be described in detail with reference to the attached drawings.

Figure 1:
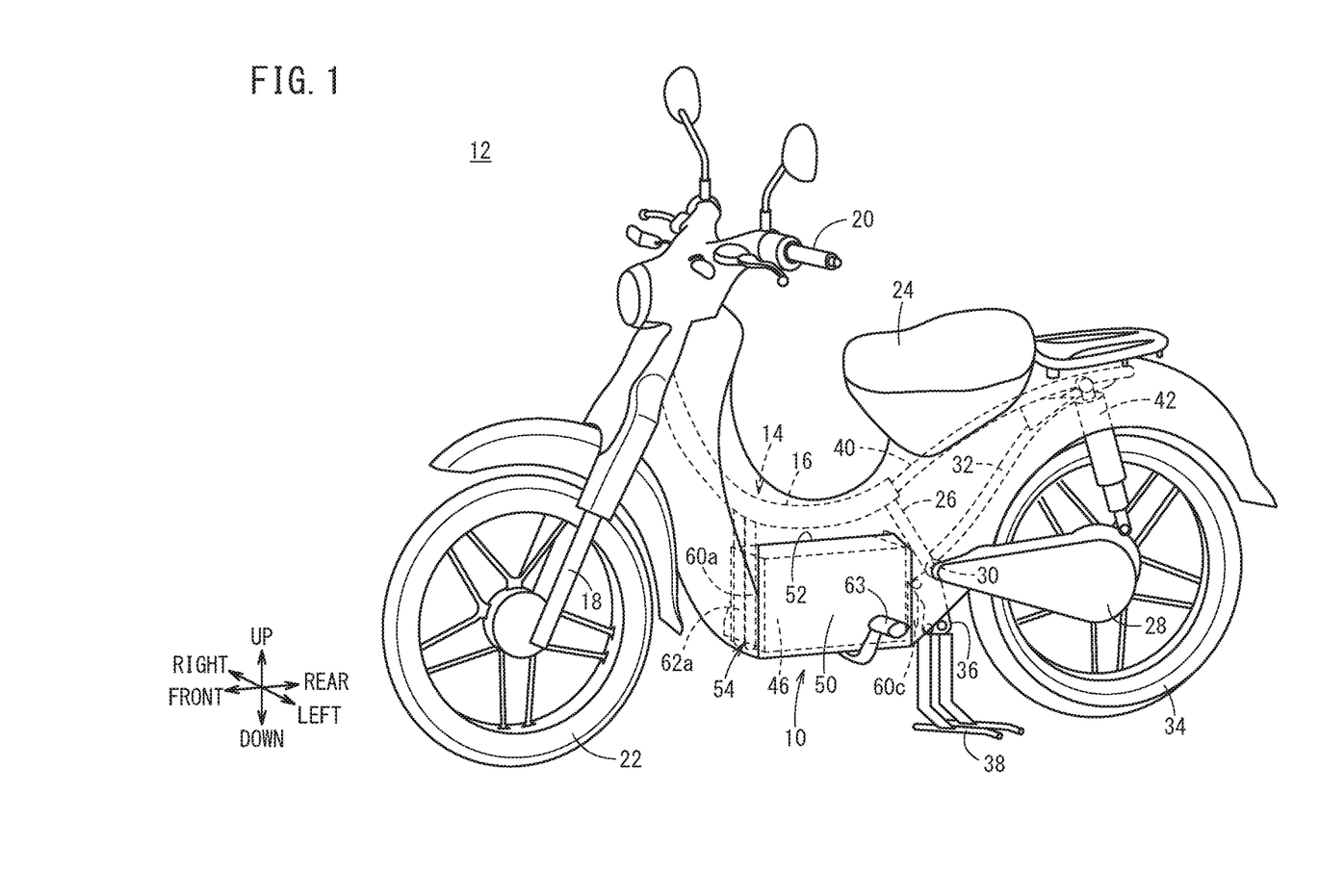
FIG. 1 is a left-side perspective view of a motorcycle having a battery case structure according to an embodiment.

FIG. 1 is a left-side perspective view of a saddle-type motorcycle (electric vehicle) 12 equipped with a battery case structure 10 according to the present embodiment. Unless otherwise specified, front-back, horizontal, and vertical directions are determined with reference to a direction viewed from a driver sitting on the motorcycle 12.

As depicted in FIG. 1, a vehicle body frame 14 of the motorcycle 12 is of the so-called backbone type and has a single main frame 16 extending from a head pipe (not shown) down backward. The head pipe has a lower end that pivotally supports a front fork 18 in a steerable manner and an upper end which pivotally supports an operating handle 20. A lower end of the front fork 18 pivotally supports a front wheel 22. In the main frame 16, an area between the head pipe and a seat 24 is lower than the other areas in order to allow the driver to climb on the motorcycle 12 easily.

A pair of right and left hanging frames 26 extends from a rear end portion of the main frame 16 down backward. A front end portion of a swingarm 28 is swingably supported at lower ends of the hanging frames 26 by a pivot shaft 30 and front ends of a pair of right and left rear frames 32 are respectively attached thereto. The swingarm 28 rotatably supports a rear wheel 34. Moreover, the swingarm 28 incorporates an electric motor and a mechanism (none of which is depicted in the drawing) that transfers the force of the electric motor to the rear wheel 34. The pivot shaft 30 is placed through an upper part of a pivot bracket 36. A side stand 38 that supports a vehicle body when the motorcycle 12 is stopped is attached to a lower part of the pivot bracket 36.

Moreover, a pair of right and left seat frames 40 extends from the rear end portion of the main frame 16 up backward. The seat 24 is placed on the seat frames 40. Furthermore, between the seat frames 40 and the swingarm 28, a rear cushion 42 is placed. Rear ends of the rear frames 32 are attached to rear ends of the seat frames 40.

In addition, below a central area of the main frame 16 in the front-back direction, the battery case structure 10 that detachably houses a battery 46, which is an electric power supply source of the electric motor, is provided. The battery case structure 10 will be described specifically with further reference to FIGS. 2 to 7.

Figure 2:
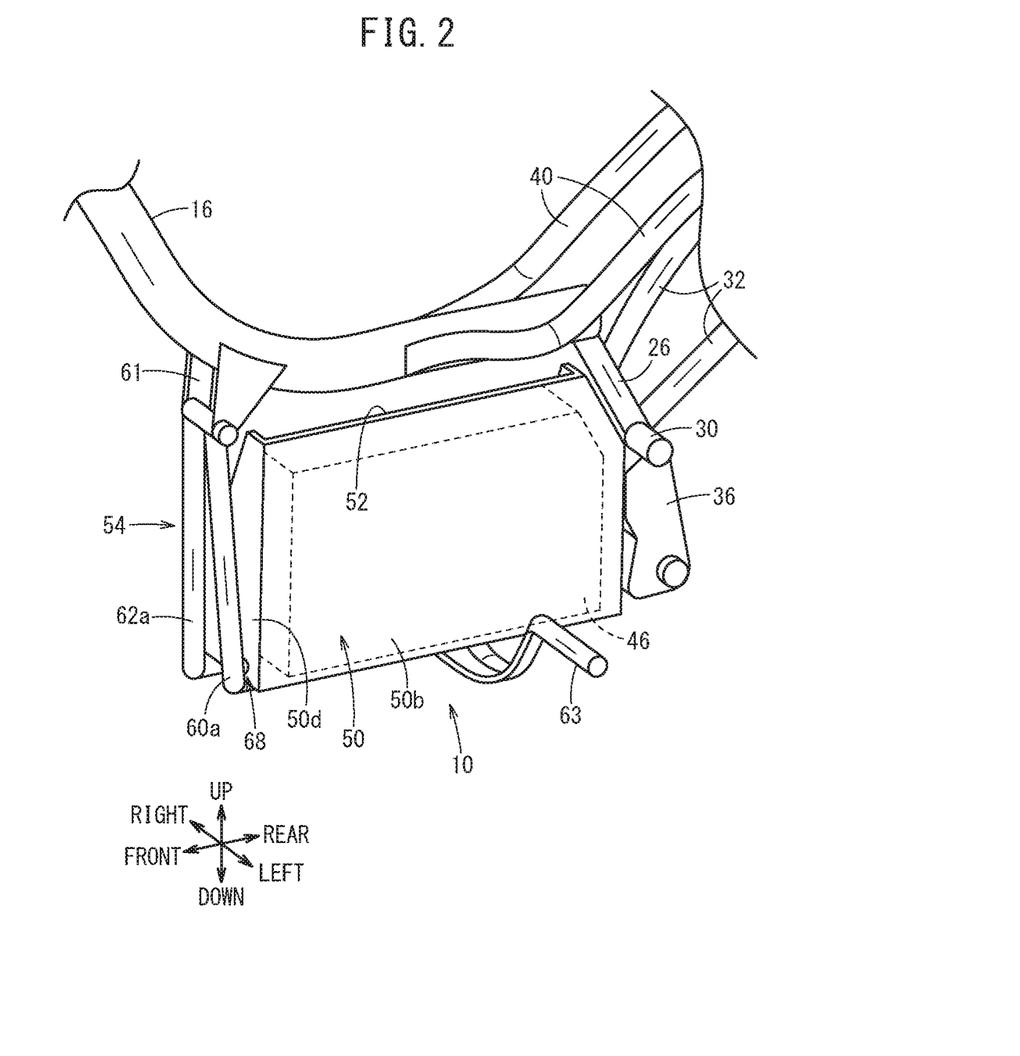
FIG. 2 is a left-side perspective view of the battery case structure of FIG. 1.
Figure 3:
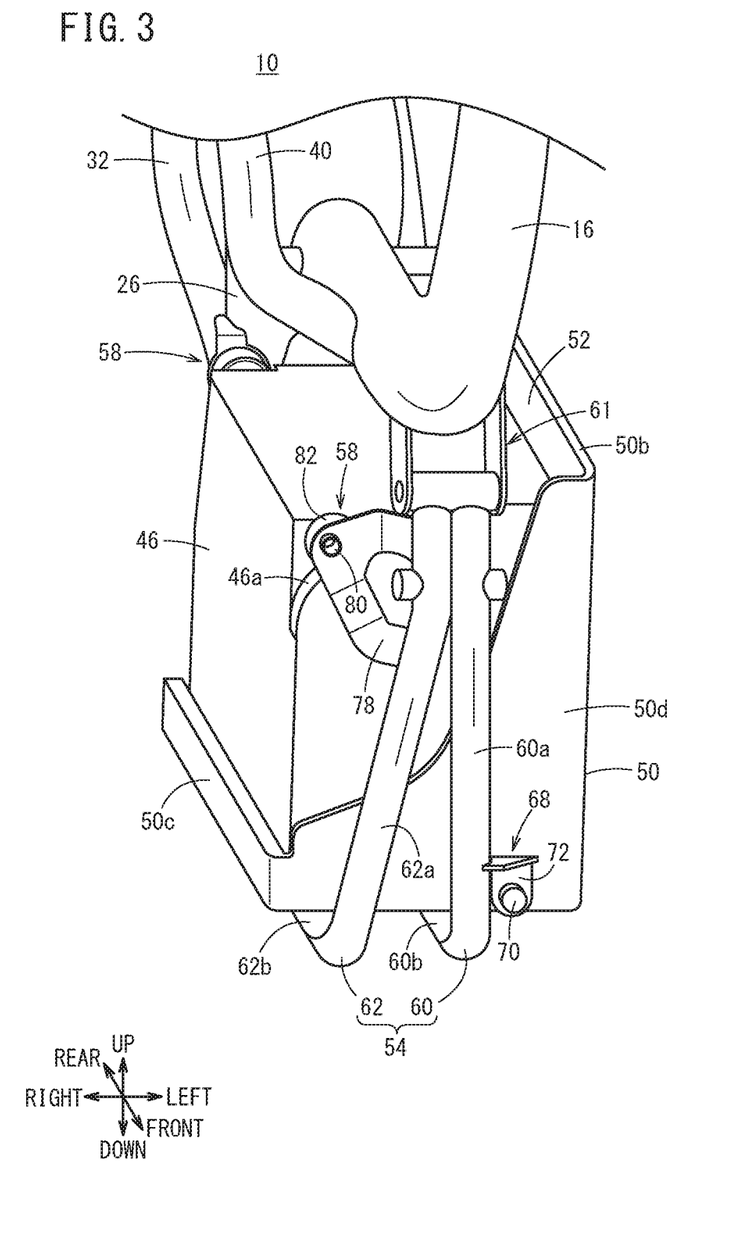
FIG. 3 is a front perspective view of the battery case structure of FIG. 1.
Figure 4:
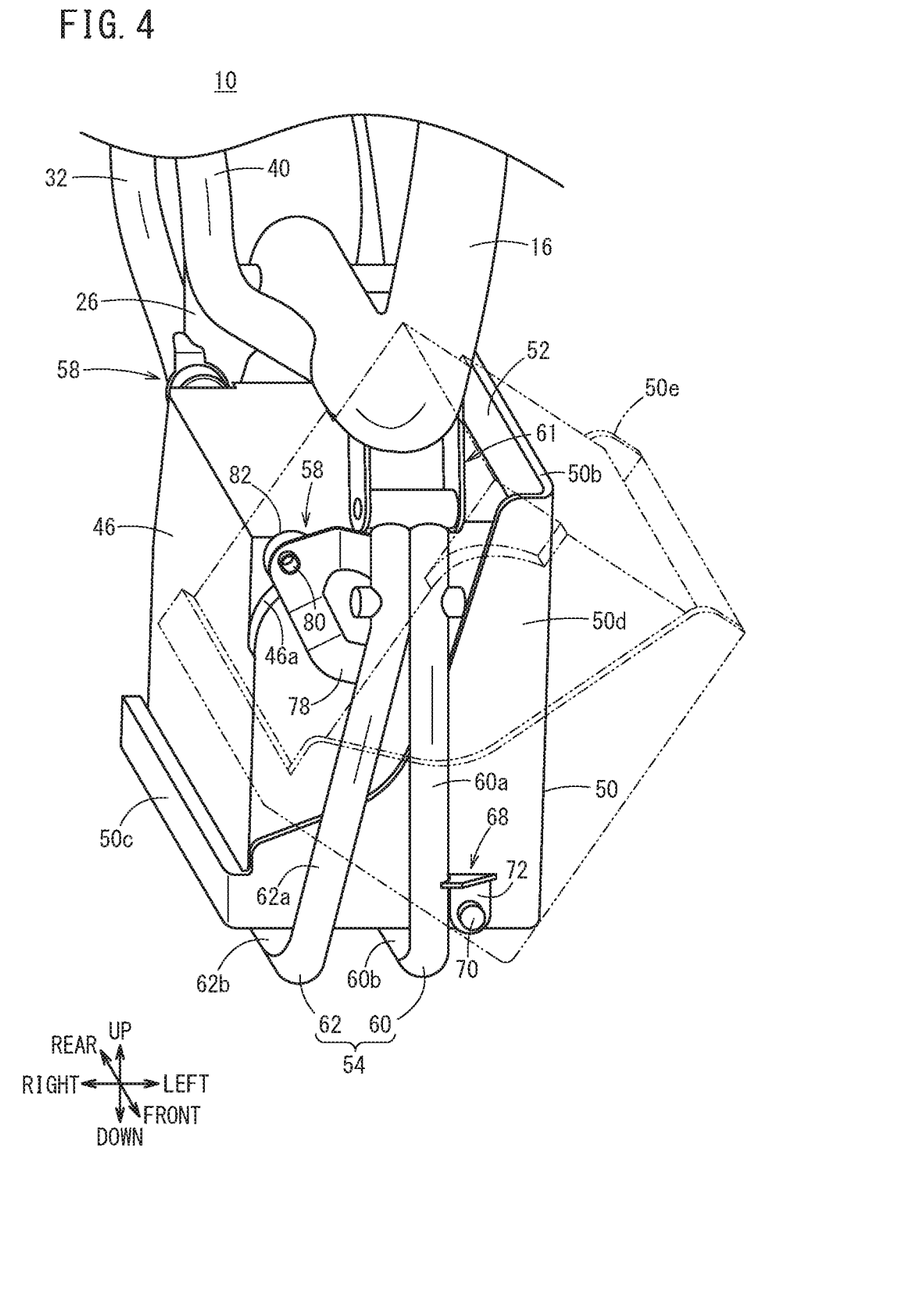
FIG. 4 is a front perspective view explaining a swing movement of a cover member of the battery case structure of FIG. 1.
Figure 5:
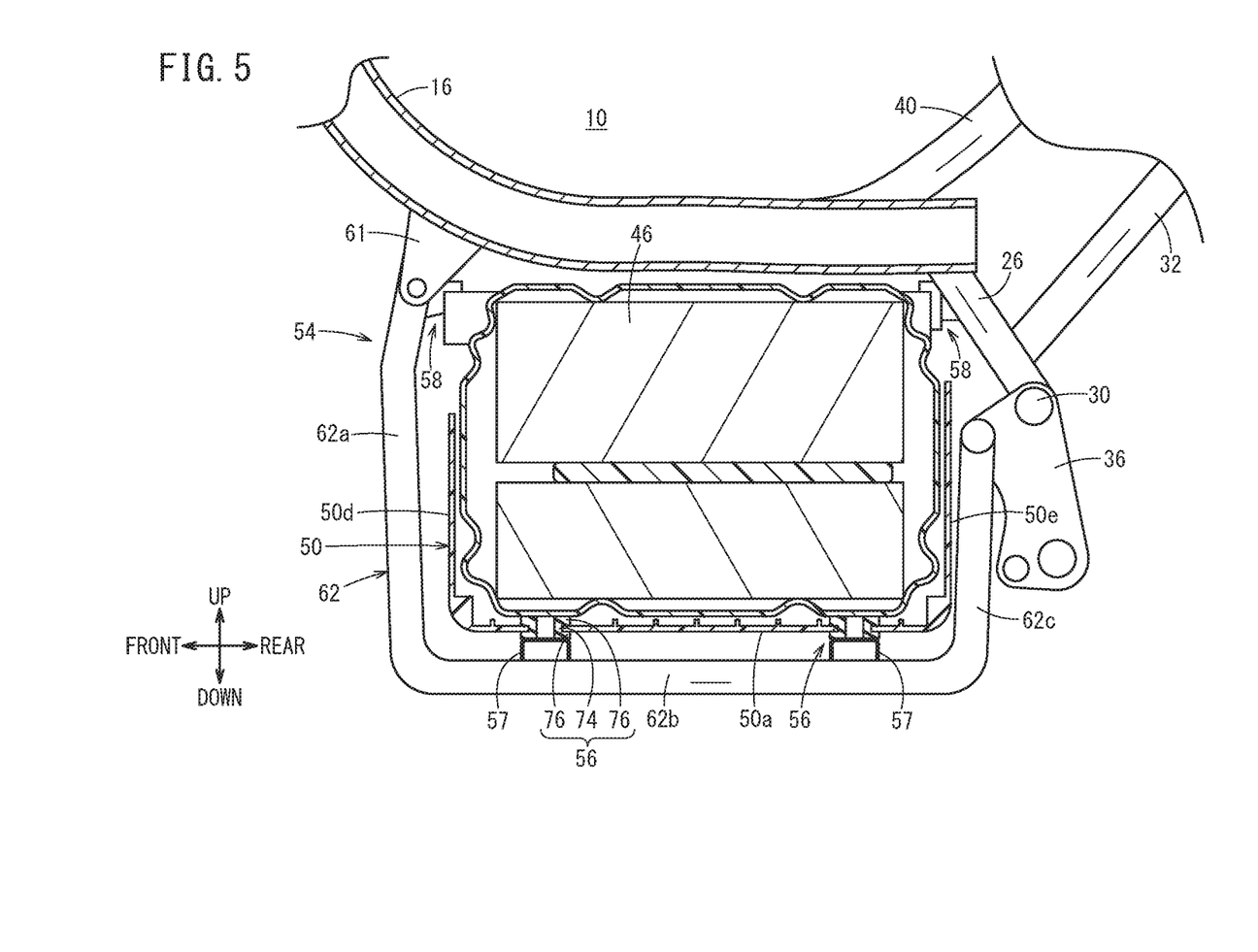
FIG. 5 is a left-side sectional view of the battery case structure of FIG. 1.
Figure 6:
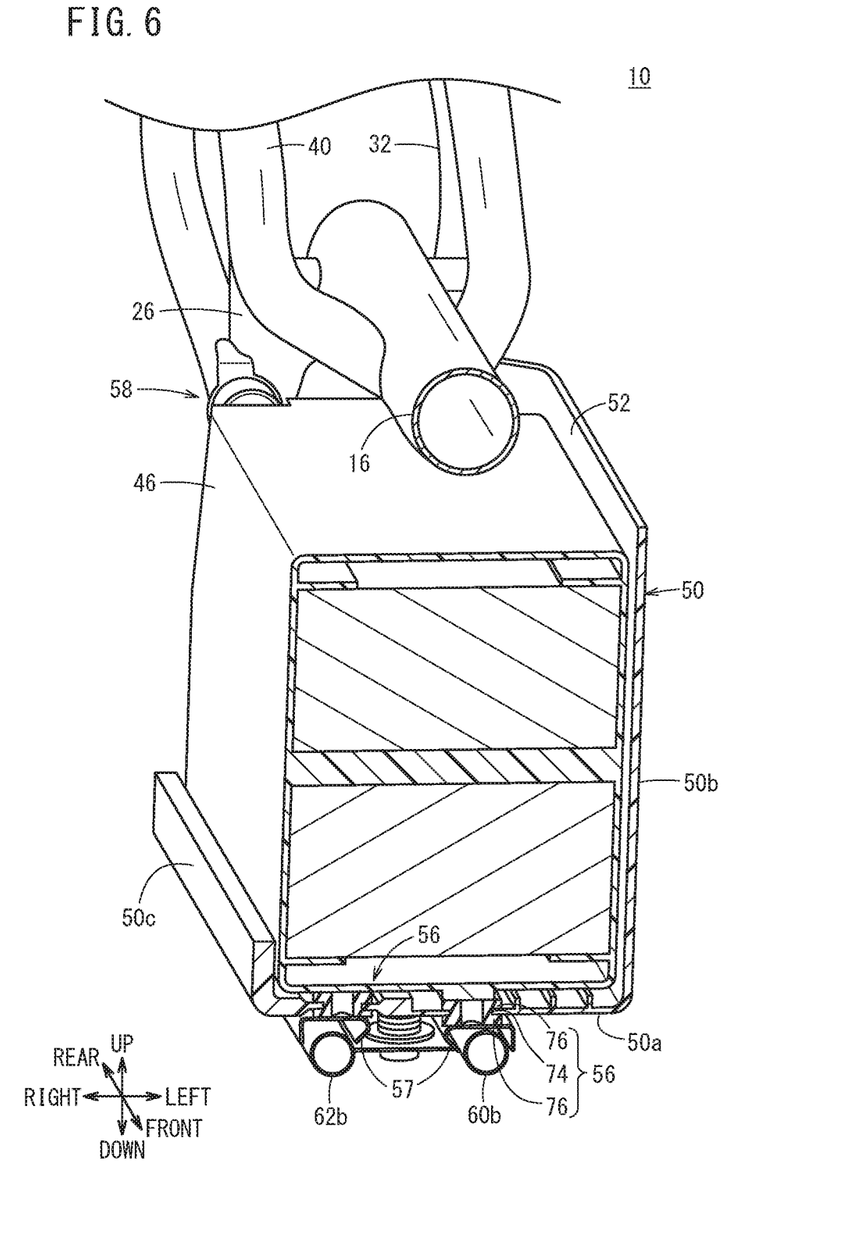
FIG. 6 is a front perspective view of the battery case structure of FIG. 1 with a partial cross-sectional view.
Figure 7:
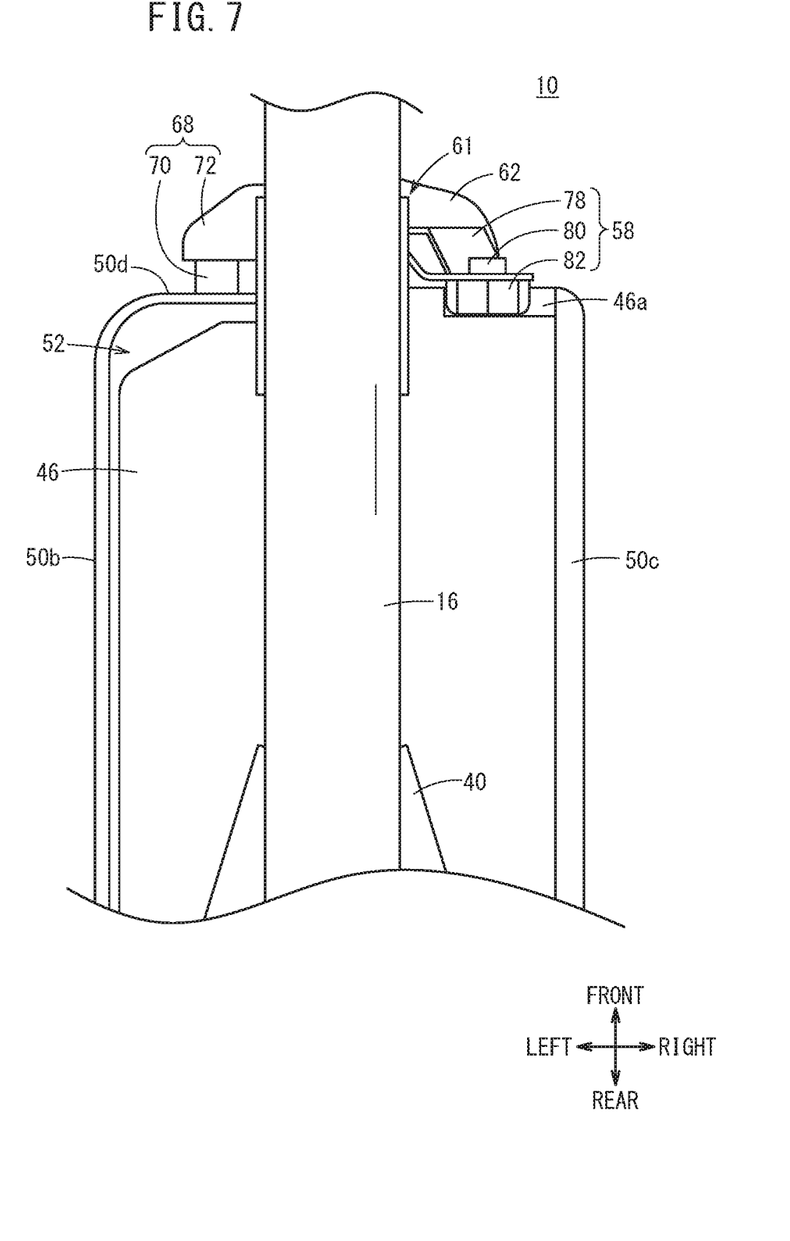
FIG. 7 is a plan view of principal portions of the battery case structure of FIG. 1.

FIG. 2 is a left-side perspective view of the battery case structure 10. FIG. 3 is a front perspective view of the battery case structure 10. FIG. 4 is a front perspective view explaining a swing movement of a cover member 50 of the battery case structure 10. FIG. 5 is a left-side sectional view of the battery case structure 10. FIG. 6 is a front perspective view of the battery case structure 10 with a partial cross-sectional view. FIG. 7 is a plan view of principal portions of the battery case structure 10.

The battery case structure 10 mainly includes a lower frame 54, the cover member 50, a lower rubber mount 56 (see FIGS. 5 and 6), and a lateral rubber mount 58 (see FIGS. 3 to 7).

The lower frame 54 is made up from a left-side frame 60 and a right-side frame 62 which are placed round a lower area of the cover member 50 in the front-back direction. The left-side frame 60 is integrally made up from a first left-side extension portion 60a, a second left-side extension portion 60b, and a third left-side extension portion 60c (see FIG. 1).

The first left-side extension portion 60a extends in the vertical direction in front of the main frame 16. An upper end of the first left-side extension portion 60a is connected to a connecting portion 61 provided in the front of the main frame 16. Moreover, a lower end of the first left-side extension portion 60a is continuous with the second left-side extension portion 60b. The second left-side extension portion 60b extends rearward from the lower end of the first left-side extension portion 60a. The third left-side extension portion 60c extends upward from a rear end of the second left-side extension portion 60b. An upper end of the third left-side extension portion 60c is connected to a front end of the pivot bracket 36.

The right-side frame 62 is integrally made up from a first right-side extension portion 62a, a second right-side extension portion 62b, and a third right-side extension portion 62c (see FIG. 5). This right-side frame 62 is configured in the same manner as the left-side frame 60 except that the first right-side extension portion 62a diagonally extends from an upper end down rightward and the third right-side extension portion 62c diagonally extends from a rear end of the second right-side extension portion 62b up leftward.

That is, the left-side frame 60 and the right-side frame 62 are integrated together in such a way that the upper end portions of the first left-side extension portion 60a and the first right-side extension portion 62a are in contact with each other in a vehicle transverse direction, and are separated farther away from each other in the vehicle transverse direction as the left-side frame 60 and the right-side frame 62 extend downward. Moreover, the second left-side extension portion 60b and the second right-side extension portion 62b are separated from each other with a predetermined spacing in the vehicle transverse direction and the cover member 50 is placed above the second left-side extension portion 60b and the second right-side extension portion 62b. Therefore, the predetermined spacing between the second left-side extension portion 60b and the second right-side extension portion 62b is set in accordance with, for example, the length or the like of the cover member 50 in the vehicle transverse direction. Furthermore, the third left-side extension portion 60c and the third right-side extension portion 62c are separated from each other with a predetermined spacing at the lower ends and come close to each other in the vehicle transverse direction as the third left-side extension portion 60c and the third right-side extension portion 62c go upward from the lower ends.

Below substantially central areas of the second left-side extension portion 60b and the second right-side extension portion 62b in the vehicle front-back direction, a pair of right and left steps 63 (see FIGS. 1 and 2) on which feet of the driver are put is attached. Moreover, on the front and rear upper faces of each of the second left-side extension portion 60b and the second right-side extension portion 62b, flat portions 57 (see FIGS. 5 and 6) are formed. That is, on the lower frame 54, a total of four flat portions 57 are provided. Of the four flat portions 57, the flat portion 57 that is formed on the front upper face of the second left-side extension portion 60b is not depicted in the drawings.

The cover member 50 can swing in the vehicle transverse direction (the vehicle widthwise direction) via a pair of a front-side swing mechanism 68 (see FIGS. 3 and 4) and a rear-side swing mechanism (not depicted in the drawing) provided on the front and rear sides. The cover member 50 has a bottom wall 50a (see FIGS. 5 and 6) on which the battery 46 is mounted, and a left side wall 50b, a right side wall 50c, a front side wall 50d, and a rear side wall 50e (see FIG. 5) which rise up from the bottom wall 50a.

Moreover, in an upper area of the cover member 50, a attaching and detaching opening 52 is formed of the left sidewall 50b, part of the front sidewall 50d, and part of the rear sidewall 50e. The attaching and detaching opening 52 approaches or moves away from the main frame 16 as the cover member 50 swings. Solid lines of FIG. 4 illustrate a state in which the cover member 50 is swung in a direction where the attaching and detaching opening 52 comes near the main frame 16. Moreover, chain double-dashed lines of FIG. 4 illustrate a state in which the cover member 50 is swung in a direction where the attaching and detaching opening 52 moves away from the main frame 16. In the present embodiment, the attaching and detaching opening 52 moves away from the main frame 16 when moving toward the left side of the main frame 16.

As indicated by the chain double-dashed lines in FIG. 4, in a state in which the attaching and detaching opening 52 is away from the main frame 16, the attaching and detaching opening 52 can be sufficiently exposed from a main body of the motorcycle 12. As a result, it is possible to insert the battery 46 into the cover member 50 through the attaching and detaching opening 52. A bottom face of the battery 46 inserted into the cover member 50 is placed on the bottom wall 50a of the cover member 50. Moreover, the sidewalls 50b to 50e of the cover member 50 are built along part or all of the side faces of the battery 46. As a result, the battery 46 inserted into the cover member 50 is held and thus it is possible to swing the battery 46 easily with the cover member 50.

As indicated by the solid lines of FIGS. 2 to 4, when the attaching and detaching opening 52 gets closer to the main frame 16, the bottom wall 50a of the cover member 50 is placed above the second left-side extension portion 60b and the second right-side extension portion 62b of the lower frame 54. At this time, the battery 46 inserted into the cover member 50 is housed between the main frame 16 and the lower frame 54 of the motorcycle 12. For the cover member 50, for example, an existing lock mechanism (not depicted in the drawing) or the like is provided. As a result, in a state in which the attaching and detaching opening 52 is close to the main frame 16 as described above, it is possible to detachably fix the cover member 50 with respect to, for example, the main frame 16, the lower frame 54, and so forth.

As depicted in FIGS. 3 and 4, the front-side swing mechanism 68 includes a shaft member 70 and a shaft support piece 72. One end of the shaft member 70 is fastened to a lower part of the front sidewall 50d of the cover member 50. Specifically, one end of the shaft member 70 is fastened to a position closer to the left sidewall 50b than the center of the cover member 50 in the vehicle transverse direction (a central axis of the motorcycle 12 along the front-back direction, that is, the center of the main frame 16). The other end of the shaft member 70 is pivotally supported by the shaft support piece 72. The shaft support piece 72 is attached to a lower part of the first left-side extension portion 60a of the lower frame 54.

The rear-side swing mechanism is configured in the same manner as the front-side swing mechanism 68 except that one end of a shaft member (not depicted in the drawing) is fastened to a lower part of the side wall 50e behind the cover member 50 and a shaft support piece (not depicted in the drawing) is attached to a lower part of the third left-side extension portion 60c of the lower frame 54. Therefore, with the front-side swing mechanism 68 and the rear-side swing mechanism, the cover member 50 is attached to the lower frame 54 in such a way that the cover member 50 can swing in the vehicle transverse direction.

As a result of the front-side swing mechanism 68 and the rear-side swing mechanism being placed as described above, the swing center of the cover member 50 is placed on the vehicle lower area's side and provided so as to be closer to the left side wall 50b than the center of the cover member 50 in the vehicle transverse direction. In other words, the swing center of the cover member 50 is located off the center of the cover member 50 in the vehicle transverse direction towards the direction in which the attaching and detaching opening 52 separates away from the main frame 16.

In the front-side swing mechanism 68 and the rear-side swing mechanism, a stopper (not depicted in the drawing) may be provided. While the cover member 50 is swung in a direction in which the attaching and detaching opening 52 moves away from the main frame 16, the stopper keeps the cover member 50 from further swinging if the attaching and detaching opening 52 is exposed wide enough to attach and detach the battery 46.

As depicted in FIGS. 5 and 6, the lower rubber mount 56 has a tubular portion 74 that penetrates the bottom wall 50a of the cover member 50, and also has mount portions 76 that are provided at both ends of the tubular portion 74 so as to sandwich the bottom wall 50a in the vertical direction. The lower rubber mount 56 may be made up from the tubular portion 74 and the mount portions 76 that are integrally formed of a single elastic material or may be made up from the tubular portion 74 formed of metal or the like and the mount portions 76 formed of an elastic material, the tubular portion 74 and the mount portions 76 being bonded together in an integrated manner.

The lower rubber mount 56 is provided at four places of the bottom wall 50a of the cover member 50. Specifically, the four lower rubber mounts 56 are provided in such a way that, when the bottom wall 50a is placed on the lower frame 54, the mount portions 76 at the lower ends thereof come into contact with the four flat portions 57.

Therefore, when the battery 46 is placed on the bottom wall 50a of the cover member 50, the mount portions 76 at the upper ends of the lower rubber mounts 56 come into contact with the bottom face of the battery 46. Moreover, when the battery 46 is housed between the lower rubber mounts 56 and the main frame 16, the mount portions 76 of the lower rubber mounts 56 at the lower ends come into contact with the flat portions 57 provided in the lower frame 54. That is, since the lower rubber mounts 56 are placed between the lower end of the battery 46 and the lower frame 54, the weight of the battery 46 in the vertical direction is transferred to the lower frame 54 via the lower rubber mounts 56.

The lateral rubber mounts 58 are made up from a pair of front and rear lateral rubber mounts 58 which are provided, of the sides of the lower frame 54, ahead of and behind the cover member 50. As depicted in FIGS. 3, 4, and 7, the front lateral rubber mount 58 includes a shaft member 80 whose one end is pivotally supported by a support piece 78 provided above the first right-side extension portion 62a; and a mount portion 82 provided at the other end of the shaft member 80. The shaft member 80 is formed of metal, for example, and is bonded to the mount portion 82, which is formed of an elastic member, in an integrated manner. The mount portion 82 is placed in a guide 46a of the battery 46 inserted into the cover member 50.

The rear lateral rubber mount 58 is configured in the same manner as the front lateral rubber mount 58 except that one end of a shaft member 80 is pivotally supported by a support piece 78 provided for the hanging frame 26.

The guide 46a is a groove that extends in the vehicle right-left direction and is provided in each of areas that become the right sides of the front end and the rear end of the battery 46 when the battery 46 is placed on the bottom wall 50a of the cover member 50. The cover member 50 is swung in a direction where the attaching and detaching opening 52 approaches the main frame 16, with the mount portion 82 being rotated in the guide 46a. As a result, the battery 46 is positioned to be housed in an appropriate place between the lower frame 54 and the main frame 16. Moreover, the battery 46 is housed in a state in which the mount portion 82 is in contact with the sidewall of the guide 46a. As a result, the movement of the battery 46 in the front-back direction is restricted and the lateral rubber mounts 58 receive a load that is applied from the battery 46 in the vehicle front-back direction.

The battery case structure 10 according to the present embodiment is basically configured as described above; next, the workings and effect thereof will be described in connection with an operation.

The motorcycle 12 provided with the battery case structure 10 allows the battery 46 to be attached and detached when, for example, the battery 46 is charged at a location that is not a parking space, the battery 46 is replaced with a standby battery, or the like.

When the battery 46 housed in the motorcycle 12 is taken out, first, by lifting a locked state by the lock mechanism and swinging the cover member 50 in the vehicle transverse direction, the attaching and detaching opening 52 is separated away from the main frame 16. In doing so, since the battery 46 can be swung together with the cover member 50, an upper part of the battery 46 can be exposed from the motorcycle 12 through the attaching and detaching opening 52. Thus, by pulling the battery 46 up leftward, the battery 46 can be taken out from the cover member 50.

Moreover, when the battery 46 is housed in the motorcycle 12, first, by swinging the cover member 50 in the vehicle transverse direction, the attaching and detaching opening 52 is separated away from the main frame 16. Next, the battery 46 is inserted into the cover member 50 through the attaching and detaching opening 52. Next, the cover member 50 is swung in a direction in which the attaching and detaching opening 52 approaches the main frame 16. In doing so, by placing the mount portion 82 of the lateral rubber mount 58 in the guide 46a of the battery 46 and rotating the mount portion 82, the lateral rubber mount 58 is guided into the guide 46a as described above. As a result, since the battery 46 is housed in an appropriate place between the lower frame 54 and the main frame 16, the cover member 50 is secured to the lower frame 54 and the like in the state above by the above-described lock mechanism.

As described above, with the battery case structure 10 according to the present embodiment, it is possible to house the battery 46 below the central area of the main frame 16 in the front-back direction, that is, in a lower area of the motorcycle 12. As a result, as compared to a case in which, for example, the battery 46 is placed between the right and left seat frames 40 below the seat 24, it is possible to ease restrictions on the size and shape of the mountable battery 46.

Moreover, by swinging the cover member 50 in the vehicle transverse direction, it is possible to attach and detach the battery 46 to and from the motorcycle 12. As a result, there is no need to lift the battery 46 above the vehicle body as in a case in which, for example, the battery 46 is attached and detached together with the opening and closing of the seat 24; therefore, it becomes possible to improve the quality of the attaching and detaching operation of the battery 46.

Furthermore, it is possible to house the battery 46 in a state in which the mount portions 76 at the upper ends of the lower rubber mounts 56 are in contact with the bottom face of the battery 46 and the mount portions 76 at the lower ends are in contact with the flat portions 57 of the lower frame 54. That is, since the lower rubber mounts 56 are placed between the lower end of the battery 46 and the lower frame 54, the weight of the battery 46 in the vertical direction can be transferred to the lower frame 54 via the lower rubber mounts 56. Moreover, as a result of the mount portions 82 of the lateral rubber mounts 58 coming into contact with the side walls of the guides 46*a*, the movement of the battery 46 in the front-back direction can be restricted and a load that is applied from the battery 46 in the vehicle front-back direction can be received by the lateral rubber mounts 58.

Since the structure above makes it possible to reduce a load that is applied to the cover member 50 from the battery 46, the durability of the battery case structure 10 can be improved. Moreover, since there is no need to increase the strength of the cover member 50 excessively, restrictions on a selectable material can be eased, whereby it becomes possible to reduce production costs.

Furthermore, the swing center of the cover member 50 is placed on the vehicle lower area's side and provided off the center of the cover member 50 in the vehicle transverse direction towards the direction where the attaching and detaching opening 52 separates away from the main frame 16. As a result, it becomes possible to reduce the amount of displacement by which the lower end of the cover member 50 is displaced downward below the vehicle while the cover member 50 swings. Therefore, when the cover member 50 is swung to attach and detach the battery 46, the lower end of the cover member 50 can be prevented from interfering with component elements such as the steps 63, for example, whereby it becomes possible to improve the design flexibility of the motorcycle 12.

While the present invention has been described above by using the preferred embodiment thereof, the technical scope of the present invention is not limited to the above description of the embodiment. It is obvious to a person skilled in the art that various changes or improvements can be made to the above-described embodiment. As is clear from the description of the claims, any embodiment obtained by making such changes or improvements to the above-described embodiment can also be included in the technical scope of the present invention. Moreover, numerals in parentheses described in the claims are the same as the numerals in the attached drawings to facilitate understanding of the present invention and are not meant to limit the present invention to the elements identified with these numerals.

For example, in the above-described embodiment, the cover member 50 swings in such a way that the attaching and detaching opening 52 separates away from the main frame 16 to the left side thereof, but the present invention is not limited thereto. A configuration in which the cover member 50 swings in such a way that the attaching and detaching opening 52 separates away from the main frame 16 to the right side thereof may be adopted. In this case, for example, in place of the left sidewall 50*b* of the cover member 50, it only needs to extend the right side wall 50*c* to an area above the cover member 50.

What is claim is:

1. A battery case structure of an electric vehicle that is of a saddle type and whose power source is a battery that is chargeable, the battery case structure comprising:
    a cover member that is placed below a central area of a main frame of the electric vehicle in a front-back direction and swings in a vehicle transverse direction;
    a lower frame that is connected to the main frame and placed round a lower area of the cover member; and
    a lateral rubber mount that is provided on a side of the lower frame and receives a load in a vehicle front-back direction from the battery, wherein
    as the cover member swings, an attaching and detaching opening provided in an upper part of the cover member approaches or moves away from the main frame,
    the battery is detachably inserted into the cover member through the attaching and detaching opening that has moved away from the main frame,
    when the attaching and detaching opening approaches the main frame, the battery inserted into the cover member is housed between the lower frame and the main frame while being supported above the lower frame, and
    on a side of the battery, a guide that guides the lateral rubber mount when the cover member swings is provided.

2. The battery case structure of the electric vehicle according to claim 1, further comprising:
    a lower rubber mount that transfers a weight of the battery in a vertical direction to the lower frame between a lower end of the battery supported above the lower frame and the lower frame.

3. The battery case structure of the electric vehicle according to claim 1, wherein
    a swing center of the cover member is placed on a vehicle lower area's side and provided off a center of the cover member in the vehicle transverse direction toward a direction where the attaching and detaching opening moves away from the main frame.

4. An electric vehicle which is of a saddle type and whose power source is a battery that is chargeable, the electric vehicle comprising:
    as a battery case structure that detachably houses the battery,
    a cover member that is placed below a central area of a main frame in a front-back direction and swings in a vehicle transverse direction;
    a lower frame that is connected to the main frame and placed round a lower area of the cover member; and
    a lateral rubber mount that is provided on a side of the lower frame and receives a load in a vehicle front-back direction from the battery, wherein
    as the cover member swings, an attaching and detaching opening provided in an upper part of the cover member approaches or moves away from the main frame,
    the battery is detachably inserted into the cover member through the attaching and detaching opening that has been moved away from the main frame,
    when the attaching and detaching opening approaches the main frame, the battery inserted into the cover member is housed between the lower frame and the main frame while being supported above the lower frame, and
    on a side of the battery, a guide that guides the lateral rubber mount when the cover member swings is provided.

* * * * *